United States Patent [19]

Dietrich, Sr.

[11] 4,381,823

[45] May 3, 1983

[54] COMBINATION FERTILIZER APPLICATOR AND TILLAGE IMPLEMENT WITH ADJUSTABLE SWEEP ASSEMBLIES

[75] Inventor: William J. Dietrich, Sr., Congerville, Ill.

[73] Assignee: DMI, Inc., Goodfield, Ill.

[21] Appl. No.: 236,300

[22] Filed: Feb. 23, 1981

[51] Int. Cl.³ .................. A01B 49/02; A01B 49/06
[52] U.S. Cl. ............................ 172/155; 111/7; 172/198; 172/201; 403/398
[58] Field of Search ............ 172/140, 142, 145, 152, 172/155, 147, 198, 199, 200, 624, 624.5, 627, 661, 688, 691, 694, 705, 710, 744, 159, 160; 111/6, 7, 73, 80, 52, 86; 403/398, 399, 400

[56] References Cited

U.S. PATENT DOCUMENTS

| | | | |
|---|---|---|---|
| 925,362 | 6/1909 | Lucier | 172/661 |
| 2,361,605 | 10/1944 | Cross | 172/688 X |
| 3,605,657 | 9/1971 | Brannan | 111/7 |
| 3,705,560 | 12/1972 | Lappin | 111/85 |
| 3,830,311 | 8/1974 | Bryson | 172/624.5 X |
| 3,991,831 | 11/1976 | Foster | 172/198 |
| 4,180,005 | 12/1979 | Zumbahlen | 111/52 |

FOREIGN PATENT DOCUMENTS

| | | | |
|---|---|---|---|
| 1551/66 | 8/1968 | Australia | 111/7 |
| 547848 | 4/1932 | Fed. Rep. of Germany | 111/52 |
| 1248658 | 11/1960 | France | 172/705 |

Primary Examiner—Richard T. Stouffer
Attorney, Agent, or Firm—Emrich, Lee, Brown & Hill

[57] ABSTRACT

Apparatus for combining light tillage and application of liquid fertilizer in a single implement includes a frame having at least a forward and a rear mounting bar. A plurality of sweep assemblies are mounted to the forward mounting bar. Anhydrous fertilizer applicator knives are mounted to the rear bar and located in strips left untilled by the sweeps. A finishing harrow is also mounted to the rear bar behind the knives to level the soil. Each sweep assembly includes a forward bar or frame element to which a plurality of laterally spaced sweeps are mounted in staggered relation. Mounting members having vertically elongated slots mount the sweep assemblies to the forward bar of the frame while permitting them to be adjusted vertically and independent of the depth of the applicator knives.

7 Claims, 5 Drawing Figures

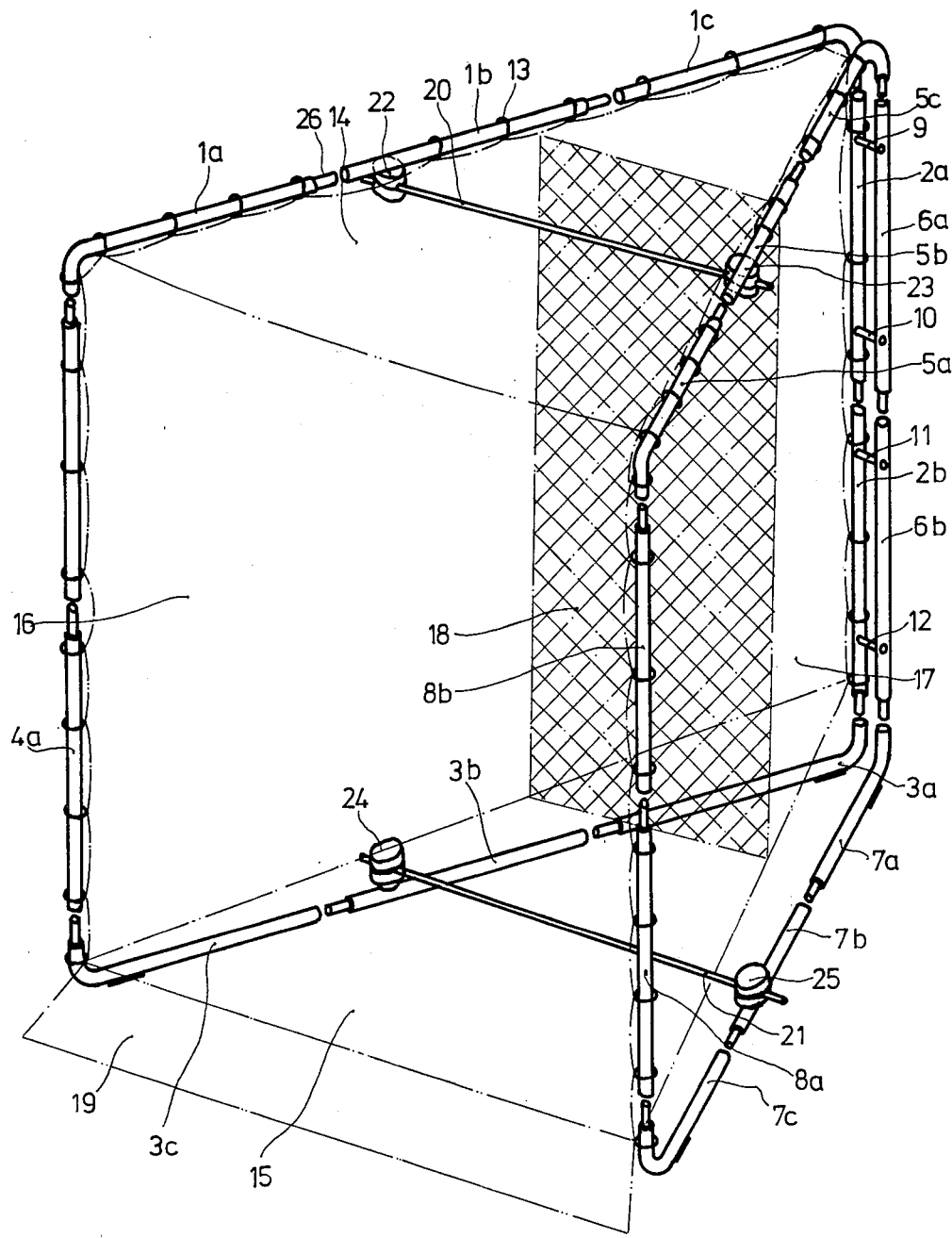

4,381,823

COMBINATION FERTILIZER APPLICATOR AND TILLAGE IMPLEMENT WITH ADJUSTABLE SWEEP ASSEMBLIES

BACKGROUND OF THE INVENTION

The present invention relates to an agricultural implement; and more particularly, it relates to an implement which is capable of light tillage, fertilizer application and leveling in single pass.

For the most part, plowing in the fall is done by conventional moldboard plow and the chisel plow. Both plows are used to break up the ground and bring up deep soil, leaving large slabs or clumps which are broken up by freeze-thaw cycles during the winter. Normally, the field must be worked again in the spring prior to planting to fill the voids, level the humps, and break up the clumps of soil produced by moldboard plowing or chisel plowing.

The application of fertilizer and the tilling of the soil surface in the spring are usually accomplished in separate passes over the field. The present invention efficiently utilizes ground breaking tools allowing the application of fertilizer and also the leveling and tilling of the soil in one pass. The invention reduces the number of passes or trips over the field and minimizes the power requirements of the farm vehicle used in tilling operations. An embodiment of the present invention also allows for the simultaneous fine working and leveling of the soil to retain moisture and for better seed bed preparation.

SUMMARY OF THE INVENTION

The present invention is directed to a tillage and fertilizing system which is designed to perform secondary tillage and level the soil while applying fertilizer in a single pass prior to the planting operation. The system includes an implement frame which may be a toolbar with a three-point hitch or a self-supporting pull frame, depending on its size. In either case, the frame has front and rear mounting bars. A plurality of sweep assemblies are mounted to the forward bar. The sweep assemblies include a horizontal bar to which are welded mounting members having vertically elongated slots. The mounting members are attached to the horizontal bar in a laterally spaced relationship.

A plurality of sweeps are also attached to the horizontal bar of each sweep assembly and staggered in a fore-and-aft direction. A clamp extends around the horizontal member and protrudes through the elongated slot of the vertical member. The ends of the clamp protruding through the elongated slot are secured and tightened, holding the vertical member tightly in place against the horizontal member of the implement frame. The clamp can be loosened allowing the vertical member (and entire assembly) to slide in a vertical direction in the travel of the clamp in the elongated slot providing for a vertical adjustment of the sweeps and the corresponding depths at which they work the soil relative to the applicator knives.

A plurality of conventional fertilizer knives are mounted on the rear mounting bar of the implement frame behind the sweeps. The sweeps are laterally spaced off the line of travel of said fertilizer knives. Horsepower requirements are improved due to the fact that the fertilizer knives cooperate with the sweeps to complete the tillage.

A harrow is also mounted to the rear mounting bar of the implement frame to follow behind the fertilizer knives. The harrow pulverizes, levels and sufficiently compacts the soil to conserve moisture.

A further embodiment of the present invention provides for staggering the sweeps fore and aft to provide trash clearance. In yet a further embodiment of the present invention, the sweeps, fertilizer knives and paddle covers are pivotally attached to the supporting frame and urged downwardly by springs, which allow the sweeps, fertilizer knives and paddle covers to swing upward to clear obstructions in the soil and then return to a normal tilling position.

In summary, the present invention provides complete fertilizing and light tillage in a one-pass system wherein forward, widely spaced sweeps are used to break, and fertilizer knives follow behind them to till the soil in strips left untilled by the sweeps. The knives not only apply fertilizer but are used for tillage. A harrow, following the fertilizer knives, further pulverizes, levels and compacts the surface soil to fill voids and conserve moisture.

An important feature of the invention is that the sweeps are provided in assemblies including a plurality of individual sweeps and shanks arranged in staggered relation in a fore-and-aft direction and spaced to permit the applicator knives to be used as tillage tools as well. The staggering of the sweeps facilitates trash clearance. Further, the rear sweeps at least partially level the ridges formed by the forward sweeps, thereby improving the overall levelling.

Other features and advantages of the present invention will be apparent to persons skilled in the art from the following detailed description of the preferred embodiments, accompanied by the attached drawings wherein identical reference numerals will refer to like parts in the various views.

THE DRAWING

FIG. 1 is a right side view of an apparatus incorporating one embodiment of the present invention;

FIG. 3 is a plan view of one sweep assembly;

FIG. 4 is a fragmentary rear elevation view of the apparatus of FIG. 3; and

DETAILED DESCRIPTION

Figure 2:
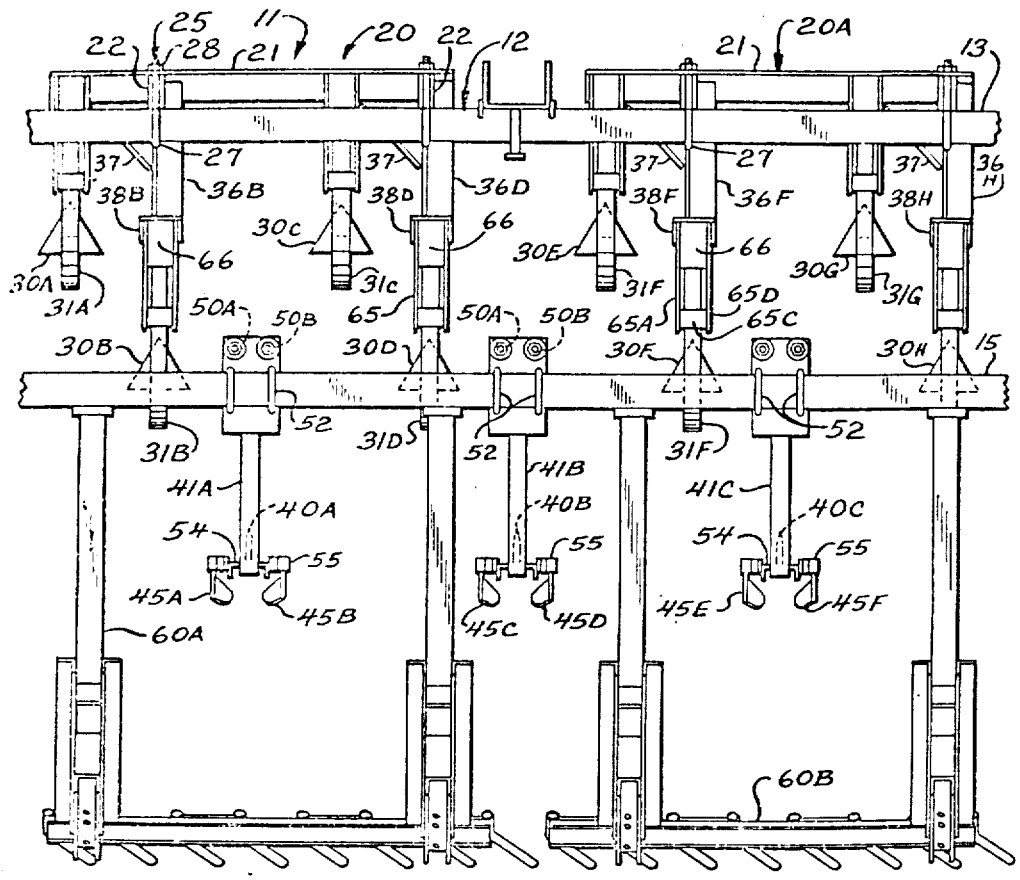
FIG. 2 is a plan view of the apparatus of FIG. 1 shown in fragmentary form.

Referring first to FIG. 2, reference numeral 11 generally designates the combination fertilizer and tillage apparatus of the present invention as shown mounted on an implement frame 12 having front and rear horizontal mounting bars 13 and 15 respectively. These bars may be tubular steel. The combination fertilizer and tillage apparatus 11 can be an integral part of a pull-type machine with its own support wheels or can be simply mounted on a frame of a standard three-point-hitch mounted tool bar.

A plurality of sweeps are arranged in individual sweep assemblies which are mounted to the forward mounting bar 13 of the implement frame. Two such assemblies are show in FIG. 2 and designated 20 and 20A. The individual sweeps are designated 30A–H. The mounting structure for the sweeps 30 will be described below. The sweeps are positioned on the front horizontal member 13 in a laterally-spaced, non-overlapping relationship. They are also alternately placed in a forward and a rear location (i.e. staggered in the fore-and-aft direction). Further, every other space between sweeps is made wider to permit the fertilizer knives, to be described, to complete the tillage. Thus the spacing between sweeps 30B and 30C is wider than the spacing between sweeps 30A and 30B. A fertilizer knife 40A is located to till the wider swath (i.e. between sweeps 30B and 30C).

Referring now to FIG. 3, the sweep assembly generally designated 20 is shown mounted on the forward mounting bar 13 of the implement frame 12. The sweep assembly 20 has a horizontal bar 21 to which are mounted a plurality of sweeps and two similar mounting members 22.

Figure 5:
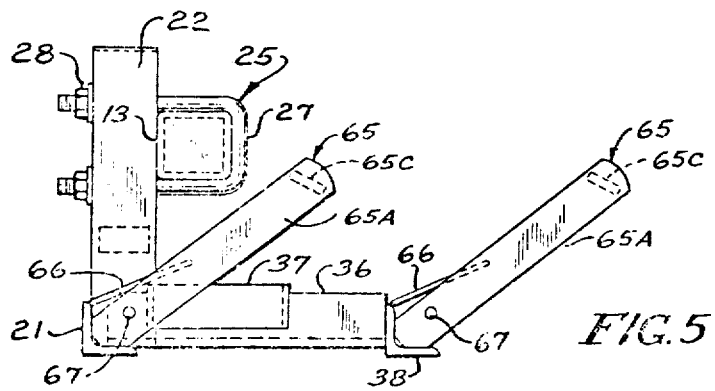
FIG. 5 is a left side view of the apparatus of FIG. 4.

As best seen in FIGS. 4 and 5, each vertical member 22 has an elongated slot 23, and is attached to the assembly frame or bar 21 in a laterally spaced relation. As can best be seen in FIG. 4, the vertically elongated slots 23 run substantially the entire length of the mounting member 22. A clamp means 25, such as the U-bolt 27 and nuts 28, best seen in FIGS. 1 and 5, extends around the horizontal member and protrudes through the elongated slots 23 of the vertical members 22. The protruding ends of the clamp means 25 are secured and tightened, holding the vertical member 22 tightly in place against the horizontal member 13 of the implement frame 12.

As best seen in FIG. 4 the clamp means 25 can be loosened allowing the entire sweep assembly to slide up and down for vertical adjustment. Preferably, the elongated slot 23 is of sufficient length that the sweeps 30 can be adjusted vertically at least four inches. This structure rigidly clamps the sweep assembly and takes advantage of the flatness of the surface of the main mounting bar 13 for rigidity. If the fertilizer knife extends two inches further than the sweeps at maximum distention, the elongated slot will allow the adjustment of the depth of penetration of the sweeps 30 within the preferred range of two to six inches above the working depth of the fertilizer knives 40.

As mentioned, the sweeps 30 are staggered fore-and-aft to provide trash clearance. As can best be seen in FIG. 3, sweeps 30B and D are mounted to the horizontal bar 21 of the sweep assembly 20 by means of an extending member 36. The extending member 36 is further reinforced by support member 37 which is welded to extending member 36 and the horizontal bar 21 of the sweep assembly 20 to provide lateral support.

Preferably, the sweeps 20 and fertilizer knives 40 are pivotally attached to the implement frame 12 and urged downwardly by spring means which allows the sweeps and fertilizer knives to swing upward to clear obstructions in the soil and then return to normal tilling position. There are many types of spring-cushioned shanks which could interchangeably be used for this purpose, but the illustrated structures will be described.

As can best be seen in FIG. 5, the horizontal bar 21 of the sweep assembly 20 has an L-shaped cross-sectional shape. A similarly shaped bracket 38 is welded to the extending member 36. In forwardly mounted sweeps 30A, C, E and G, a stationary member 65 is welded to the horizontal bar 21; and in rearwardly mounted sweeps 30B, D, F and H, stationary member 65 is welded to bracket 38. A reinforcing brace attached to the top of horizontal bar 21 or bracket 38 is attached to a point along the length of stationary member 65 by suitable means such as welding.

As can best be seen in FIGS. 3 and 4, each stationary member 65 has sides 65A and B and a top plate 65C. Referring now to FIG. 5, stationary member sides 65A and B have holes 67 for a pivot bolt 32 shown in FIG. 3. As can best be seen in FIG. 1 and FIG. 3, pivot arm 34 extends rearwardly from inside the sides of stationary member 65 where it is rotatably attached by pivot bolt 32. As shown in FIG. 1, the shank 31 of sweep 30 is attached to pivot arm 34 by suitable means such as a bolt 39. Spring means 35 is attached to and extends from the rear terminal portion of pivot arm 34 by suitable means such as a bolt 39. Spring means 35 is attached to and extends from the rear terminal portion of pivot arm 34 and extends upward to the top plate 65C of the stationary member 65. When sweep 30 encounters an obstruction, sweep 30 is forced backward relative to moving implement frame 12, pivot arm 34 swings upward compressing spring means 35 and lifting sweep 30 clear of the obstruction. After the obstruction is cleared, the spring means 35 forces pivot arm 34 and attached shank 31 of sweep 30 downward into operating position.

A set of fertilizer knives, generally designated 40A–40C, are mounted to the rear horizontal member 15 of the implement frame 12. The mounting structure for the fertilizer knives 40A–40C will be described later. Referring now to only one knife 40, as best seen in FIG. 1, a fertilizer tube 44 extends along the curved portion of the fertilizer knife shank 41 from a pipe 43 to a source of liquid fertilizer (not shown), such as anhydrous ammonia. Pipe 43 extends from the tube 44 to a point behind the bottom of knife 40. Fertilizer flowing through tube 44 and pipe 43 is deposited in a groove made by the fertilizer knife 40 as it passes through the ground.

A set of paddle covers 45A–45F are mounted to the shanks 41A–41C of the fertilizer knives 40A–40C in outwardly laterally spaced opposing pairs. Referring now to only one knife 40, as best seen in FIG. 1, paddle cover 45 is attached to a paddle cover arm 55 which is attached to a paddle member 54. Paddle member 54 is attached to the shank 41 by bracket 56. As best seen in FIG. 2, the paddle member 54 and paddle arm 55 outwardly and laterally space the pairs of paddle covers 45A. Each pair of paddle covers 45A, 45B; 45C, 45D; and 45E, 45F extends rearwardly behind the ground breaking surfaces of the fertilizer knife 41 and inwardly towards each other.

As can be seen in FIG. 1, the fertilizer knife 40 protrudes below the paddle cover 45. As the fertilizer knife 40 passes through the ground creating a groove wherein fertilizer is deposited by pipe 43; paddle cover 45, running along the top surfaces of the ground, redistributes and levels the ground in its path. Ground displaced by the knife 40 is, for the most part, redeposited in the groove where it prevents fertilizer from escaping. Later, when herbicide is sprayed on the field and then incorporated in the soil ahead of a planter, the herbicide is mixed with the top two or three inches of soil.

Referring now to FIG. 2, the fertilizer knives 40A–C and paddle covers 45A–F are positioned laterally on the rear horizontal member 15 between the widely spaced sweeps 20B and C, D and E, F and G so as to run in the wide ribbons of untilled soil. The spacing of the cultivator sweeps 20, to produce narrow and wide ribbons of soil, and the placement of the fertilizer knives 40 and paddle covers 45, to run behind and between the sweeps 20 in the wide untilled strips of ground, provides efficient tillage and minimizes horsepower requirements.

Fertilizer knives 40 and paddle covers 45 do not repeat the tilling and leveling action of the sweeps.

Attached to the rear horizontal member 15 of the implement frame 12 are single bar harrows 60A and B, which drag over the ground behind the fertilizer knives 40A-C and paddle covers 45A through F. The harrows 60A and B further pulverize, level and sufficiently compact the top soil surface to conserve moisture. Although single bar harrows 60A and B are shown, an ordinary multiple bar harrow is advantageous in some soil conditions.

Referring now to FIG. 1, the sweeps 30, the fertilizer knife 40 and paddle cover 45 are normally mounted with no provision for vertical adjustment other than the raising or lowering of the implement frame 12 to which they are mounted. There is no concensus within the agricultural community as to the proper depth of penetration of the sweeps beneath the ground surface relative to the penetration of the fertilizer knives. Indeed, the most advantageous depth of the sweeps in relation to the fertilizer knives may change for differing soil conditions and crops. Within the agricultural community, preference dictates that the sweeps are set to penetrate the soil to a depth of from two to six inches above the depth of the fertilizer knives 40. Unlike previous tillage units, an embodiment of the present invention provides means for readily adjusting the vertical position of the sweeps within this range.

The spring mounted fertilizer knife 40 is of standard construction. Fertilizer knife shank 41 is attached to a lower plate 51 by means of a bolt 69. Lower plate 51 is pivotally attached at hinge 47 to upper plate 49. Upper plate 49 is attached to rear horizontal member 15 of the implement frame 12 by U-bolts 52. Spring means 50 attached to upper and lower plates 49 and 50 pulls the plates together to urge fertilizer knife 40 in a downward position. As can best be seen in FIG. 2, two springs 50A and B comprise the spring means. When fertilizer knife 40 encounters an obstruction, fertilizer knife 40 is held in place relative to the moving implement frame 12, shank 41 is pushed upward and forces upper and lower plates 49 and 50 to separate compressing spring means 50. After the obstruction is cleared the spring means 50 forces the plates 49 and 50 to come together urging fertilizer knife 40 downward into operating position.

OPERATION

As will be appreciated by those skilled in the art, the front horizontal mounting base 13 and the rear horizontal mounting bar 15 may be an integral part of the frame of a pull-type implement with its own support wheels, or these members can simply be the front and rear members of a standard three-point-hitch mounted tool bar. The sweep assemblies 20 can be mounted to the front horizontal member and adjusted vertically by loosening nuts 28 on U-bolt 27 so that the vertical member slides up and down in the travel of the U-bolt 27 in elongated slot 23. Thus the sweeps can be set to till at various depths, allowing for differences in soil conditions, crops and personal preference. It will also be observed that the sweep assemblies are independent and modular. This modularity permits them to be mounted as units to other tool bars (such as a farmer may already have) or to be removed, if desired.

The sweeps 30 are used to break and level the soil and are spaced in a non-overlapping manner to leave narrow ribbons of soil between the sweeps 30 that will normally be broken and moved by the action of the sweeps 30 passing by. The sweeps 30 are also widely spaced to leave untilled strips of substantial width. Rearwardly mounted fertilizer knives 40 located behind and between the sweeps 30 break the soil in the wide previously undisturbed strips. The paddle covers 45 redistribute the soil back into the groove formed by the fertilizer knives to cover the fertilizer and prevent its escape, and they further level the wide strips between the sweeps. A harrow 60 following the fertilizer knives 40 further pulverizes, levels, and compacts the soil sufficiently to conserve moisture.

The staggering of the sweeps, fore and aft, provides trash clearance. It also provides some leveling in that the rear sweeps will reduce the ridges formed by the laterally adjacent forward sweep. The pivotally attached sweeps and fertilizer knives swing upward to clear obstructions in the soil and then return to a normal tilling position. Thus the present invention provides complete fertilizing and tillage while simultaneously sealing the surface of the soil to retain moisture in a one-pass system, providing substantial savings in fuel expenses and time.

Having thus disclosed preferred embodiments of the invention, persons skilled in the art will be able to modify certain of the structure which has been disclosed and to substitute equivalent elements for those described while continuing to practice the principle of the invention; and it is, therefore, intended that all such modifications and substitutions be covered and embraced within the spirit and scope of the appended claims.

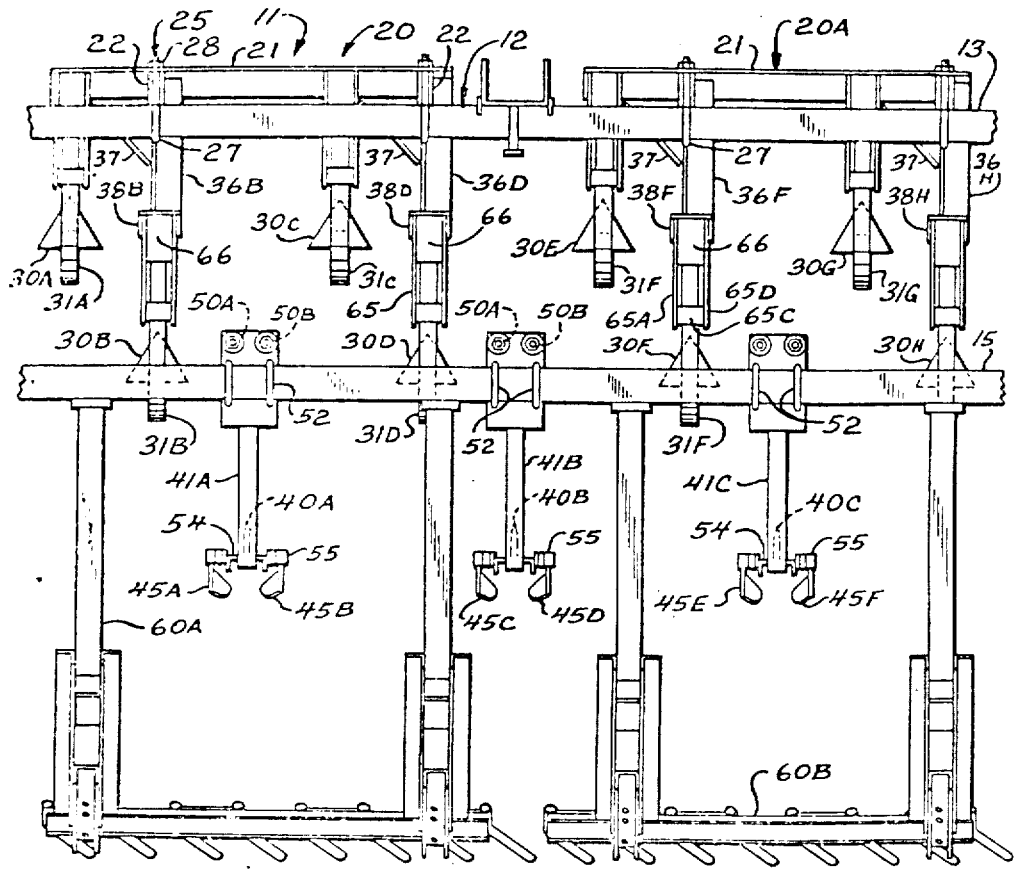

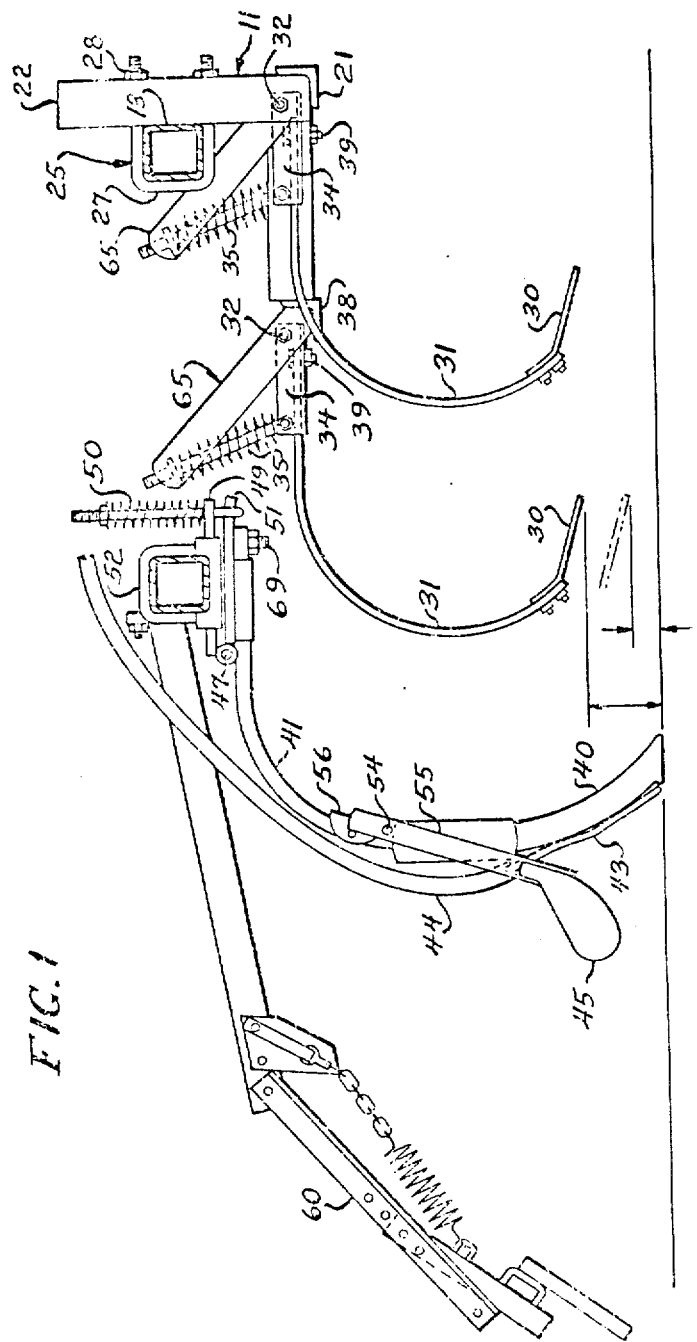

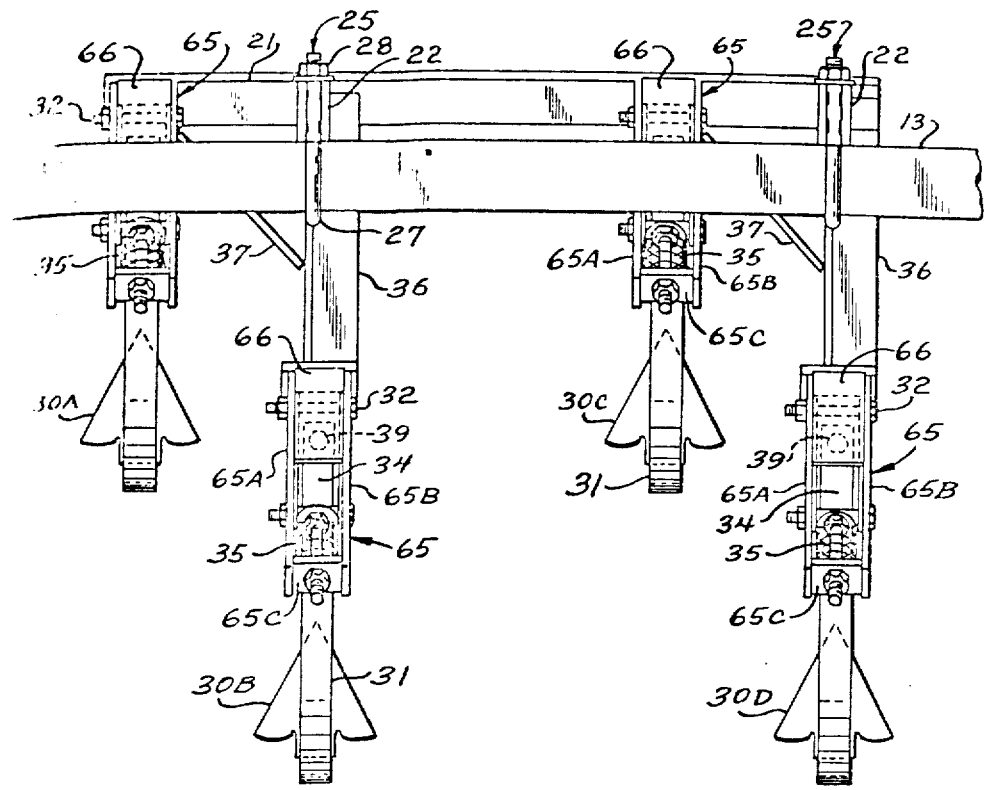
FIG. 3
FIG. 4
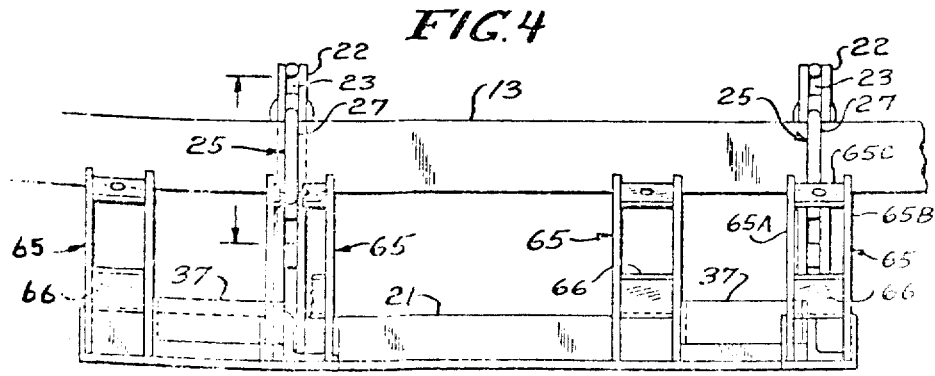

I claim:

1. A one-pass tillage, fertilizing and leveling apparatus comprising: an implement frame adapted to be pulled by a vehicle; subframe means; means for mounting said subframe means to said implement frame in a vertically adjusted position; a plurality of tillage tools mounted to one of said implement frame and subframe means; a plurality of fertilizer applicator knives mounted to the other of said implement frame and subframe means; said knives and said tools being laterally spaced and in cooperation such that both said knives and said tools till said unbroken soil in strips of generally equal lateral spacing and without overlap; and leveling means mounted to said implement frame behind said tools and said knives for pulverizing and leveling the soil loosened thereby.

2. The apparatus of claim 1 wherein said tillage tools are mounted to said subframe means in a forward position relative to said applicator knives; and wherein said subframe means comprises a plurality of subframes, each subframe carrying a plurality of tillage tools; said mounting means comprising means for individually mounting each of said subframes to said implement frame in a vertically adjusted position.

3. The apparatus of claim 2 wherein each of said plurality of tillage tools mounted to each subframe is spaced relative to the other tillage tools mounted to the same subframe in a generally equal lateral spacing, and wherein said applicator knives are located behind said tillage tools in place of an associated tillage tool and at the same lateral spacing as the other tillage tools are placed.

4. The apparatus of claim 2 wherein each of said subframes includes a forward horizontal member extending transverse of the direction of travel of said vehicle in use, and a plurality of members extending rearwardly of said forward member and spaced at the desired spacing of said tools, the length of said rearwardly extending members being alternately long and short thereby to stagger the placement of said tools.

5. The apparatus of claim 4 wherein each of said tools is mounted to the rear of an associated rearwardly extending member of one of said subframes, said apparatus further including spring means for each of said tools for resiliently urging the same into ground-engaging position while permitting said tool to swing upwardly to clear obstructions in the soil.

6. The apparatus of claim 1 wherein said leveling means comprises a spring tooth harrow.

7. The apparatus of claim 1 wherein each of said fertilizer knives further includes paddle covers mounted thereto and extending rearwardly thereof for redistributing soil behind said fertilizer knife as said fertilizer knife passes through the ground.

* * * * *

UNITED STATES PATENT AND TRADEMARK OFFICE
CERTIFICATE OF CORRECTION

PATENT NO. : 4,381,823

DATED : May 3, 1983

INVENTOR(S) : William J. Dietrich, Sr.

It is certified that error appears in the above-identified patent and that said Letters Patent is hereby corrected as shown below:

The Title Page showing the illustrative figure should be deleted to appear as per attached title page.

In the drawings the single sheet of drawing should be deleted to be replaced with (3) sheets of drawings as shown on the attached sheets.

Signed and Sealed this

Twenty-third Day of August 1983

[SEAL]

Attest:

*Attesting Officer*

GERALD J. MOSSINGHOFF

*Commissioner of Patents and Trademarks*

United States Patent [19]

Dietrich, Sr.

[11] 4,381,823
[45] May 3, 1983

[54] COMBINATION FERTILIZER APPLICATOR AND TILLAGE IMPLEMENT WITH ADJUSTABLE SWEEP ASSEMBLIES

[75] Inventor: William J. Dietrich, Sr., Congerville, Ill.

[73] Assignee: DMI, Inc., Goodfield, Ill.

[21] Appl. No.: 236,300

[22] Filed: Feb. 23, 1981

[51] Int. Cl.³ .................. A01B 49/02; A01B 49/06
[52] U.S. Cl. ........................ 172/155; 111/7; 172/198; 172/201; 403/398
[58] Field of Search ........... 172/140, 142, 145, 152, 172/155, 147, 198, 199, 200, 624, 624.5, 627, 661, 688, 691, 694, 705, 710, 744, 159, 160; 111/6, 7, 73, 80, 52, 86; 403/398, 399, 400

[56] References Cited

U.S. PATENT DOCUMENTS

| | | | |
|---|---|---|---|
| 925,362 | 6/1909 | Lucier | 172/661 |
| 2,361,605 | 10/1944 | Cross | 172/688 X |
| 3,605,657 | 9/1971 | Brannan | 111/7 |
| 3,705,560 | 12/1972 | Lappin | 111/85 |
| 3,830,311 | 8/1974 | Bryson | 172/624.5 X |
| 3,991,831 | 11/1976 | Foster | 172/198 |
| 4,180,005 | 12/1979 | Zumbahlen | 111/52 |

FOREIGN PATENT DOCUMENTS

| | | | |
|---|---|---|---|
| 1551/66 | 8/1968 | Australia | 111/7 |
| 547848 | 4/1932 | Fed. Rep. of Germany | 111/52 |
| 1248658 | 11/1960 | France | 172/705 |

Primary Examiner—Richard T. Stouffer
Attorney, Agent, or Firm—Emrich, Lee, Brown & Hill

[57] ABSTRACT

Apparatus for combining light tillage and application of liquid fertilizer in a single implement includes a frame having at least a forward and a rear mounting bar. A plurality of sweep assemblies are mounted to the forward mounting bar. Anhydrous fertilizer applicator knives are mounted to the rear bar and located in strips left untilled by the sweeps. A finishing harrow is also mounted to the rear bar behind the knives to level the soil. Each sweep assembly includes a forward bar or frame element to which a plurality of laterally spaced sweeps are mounted in staggered relation. Mounting members having vertically elongated slots mount the sweep assemblies to the forward bar of the frame while permitting them to be adjusted vertically and independent of the depth of the applicator knives.

7 Claims, 5 Drawing Figures